United States Patent
Temple

(10) Patent No.: US 6,882,613 B2
(45) Date of Patent: Apr. 19, 2005

(54) CYLINDRICAL MEDIUM FOR STORING HOLOGRAPHIC DATA AND METHODS AND APPARATUS FOR MANIPULATING DATA USING THE CYLINDRICAL MEDIUM

(75) Inventor: Doyle A. Temple, Hampton, VA (US)

(73) Assignee: Hampton University, Hampton, VA (US)

( * ) Notice: Subject to any disclaimer, the term of this patent is extended or adjusted under 35 U.S.C. 154(b) by 533 days.

(21) Appl. No.: 09/885,067

(22) Filed: Jun. 21, 2001

(65) Prior Publication Data

US 2003/0002424 A1 Jan. 2, 2003

(51) Int. Cl.$^7$ ................................................. G11B 7/00
(52) U.S. Cl. .................................. 369/103; 369/112.29
(58) Field of Search ........................... 369/103, 109.01, 369/112.01, 112.02, 112.16, 112.29, 120, 121, 124.03

(56) References Cited

U.S. PATENT DOCUMENTS

| | | | |
|---|---|---|---|
| 5,339,305 A | * | 8/1994 | Curtis et al. ................. 369/103 |
| 5,844,700 A | * | 12/1998 | Jeganathan et al. ............. 359/7 |
| 5,905,584 A | | 5/1999 | Osugi |
| 6,101,161 A | | 8/2000 | Yang |
| 6,301,028 B1 | * | 10/2001 | Tanaka et al. ................. 359/22 |
| 6,452,890 B1 | * | 9/2002 | Kawano et al. ......... 369/110.01 |
| 6,504,810 B1 | * | 1/2003 | Itoh et al. .................... 369/103 |
| 6,574,181 B1 | * | 6/2003 | Tanaka et al. ............... 369/103 |

* cited by examiner

Primary Examiner—Paul W. Huber
(74) Attorney, Agent, or Firm—Millen, White, Zelano & Branigan, P.C.

(57) ABSTRACT

Holographic data is stored in a cylindrical crystal by directing a signal beam with data encoded therewith axially through an end face of the crystal, which signal beam interferes with a reference beam directed radially through the cylindrical side surface of the crystal. By rotating the crystal about its axis, numerous holograms are recorded therein an annular layer and by indexing the crystal axially the annular layers are stacked to further increase the storage capacity of the crystal. The holograms are read from the crystal by focusing a reference beam therethrough in a radial director for diffraction with the stored holograms to produce a defracted reference beam which emerges axially from the crystal. The diffracted reference beam is then read with a detector in the form of a CCD camera.

7 Claims, 6 Drawing Sheets

US 6,882,613 B2

CYLINDRICAL MEDIUM FOR STORING HOLOGRAPHIC DATA AND METHODS AND APPARATUS FOR MANIPULATING DATA USING THE CYLINDRICAL MEDIUM

FIELD OF THE INVENTION

The present invention relates to a cylindrical medium for storing holographic data and to methods of and apparatus for manipulating data using the medium. More particularly, the present invention is directed to a cylindrical storage medium in which rotation of the medium and apparatus, one with respect to the other, provides a method of manipulating holographic data.

BACKGROUND OF THE INVENTION

There is a constant demand to increase the storage capacity of data systems. As has been set forth in U.S. Pat. No. 6,101,161 issued Aug. 8, 2001, this is especially the case for storing large amounts of data such as, for example, the data required for motion picture images. There are of course a meriad of other needs for data storage, such as storage for library text and other massive amounts of information, which information can for example relate to anything from scientific data to financial data. In the '161 patent, a cylindrical storage medium is indexed rotationally to store holographic image data in the form of pixel arrays generated from a spacial light modulator system (SLM). Multiple holograms are stored in the cylindrical crystal using angular multiplexing by rotating the crystal about its z-axis. Attempts to successfully store and retrieve data from systems such as that of the '161 patent have proved illusive. A primary reason for this is the complicated cylindrical optics for imagery into and out of the cylinder. Another reason for this difficulty is that extraordinarily polarized laser beams appear to be necessary to store holographic gratings in the x, y, plane of cylindrical crystals.

In addition, prior art approaches do not identify a range of angles for angularly positioning each hologram in a cylindrical crystal. Moreover, the prior art does not teach or suggest that a cylindrical crystal may be moved axially in the direction of its c-axis to record holograms at different axial locations in the cylindrical crystal so as to vastly increase the storage capacity of a single cylindrical crystal.

SUMMARY OF THE INVENTION

In view of the aforementioned considerations, the present invention is directed to a cylindrical crystal formed around an axis wherein the cylindrical crystal has holograms stored in annular arrays therein about the axis thereof, with the annular arrays being stacked in an axial direction.

The present invention is also directed to a method of storing holographic data in a cylindrical crystal wherein the cylindrical crystal is formed about an axis and has an axially facing surface and a cylindrical peripherial surface. In accordance with the method, a reference beam is focused through one of the surfaces and a signal beam containing the data to be stored is focused through the other of the surfaces. The signal and reference beams interfere within the crystal to form a hologram therein containing the data. The method further includes rotating the crystal about the axis to form additional angularly spaced holograms.

In addition, the method includes translating the cylindrical crystal axially to store additional layers of angularly spaced holograms within the crystal.

In accordance with an apparatus for writing holograms into the cylindrical crystal, the apparatus includes a source of laser light focused through a polarizing device and a beam splitter for dividing the light into a signal beam and a reference beam. A first optical path is provided for directing the signal beam through an SLM and into the crystal in a first direction with respect to the axis to the crystal and a second optical path is provided for directing the reference beam into the crystal in direction transverse to the reference signal for interference with the signal beam to form and store the holograms within the crystal.

DETAILED DESCRIPTION

Figure 1:
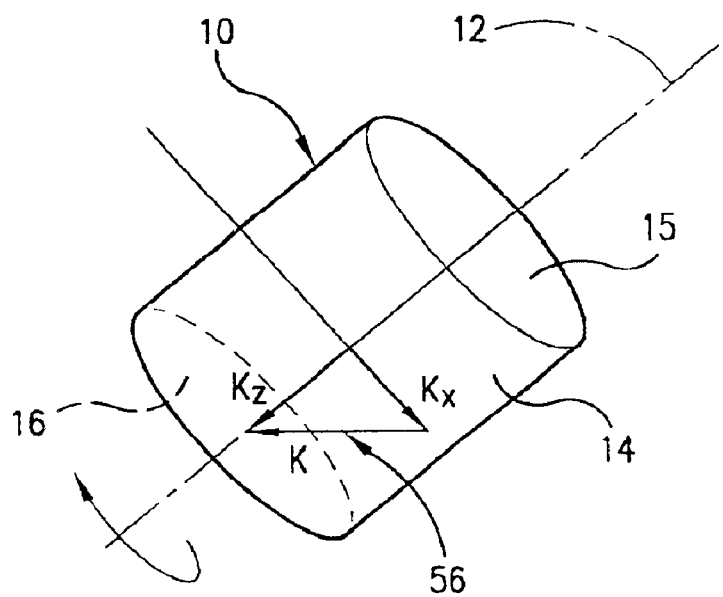
FIG. 1 is an enlarged perspective view of a crystal configured in accordance with the principals of the present invention.

Referring now to FIG. 1, there is shown a cylindrical crystal 10 configured in accordance with the principals of the present invention. The cylindrical crystal 10 is preferably made of photorefractive crystal material such as lithium niobate ($LiNbO_3$) or lithium borate ($Li_2B_2O_4$). While these materials are preferred and available, other photorefractive materials maybe used, such as other glasses, for example $SiO_2$: Ge, or organic polymer materials and crystals. It is a practice to dope photorefractive crystals in order to enhance their holographic storage characteristics and the crystal 10 may utilize such enhancements.

Figure 2:
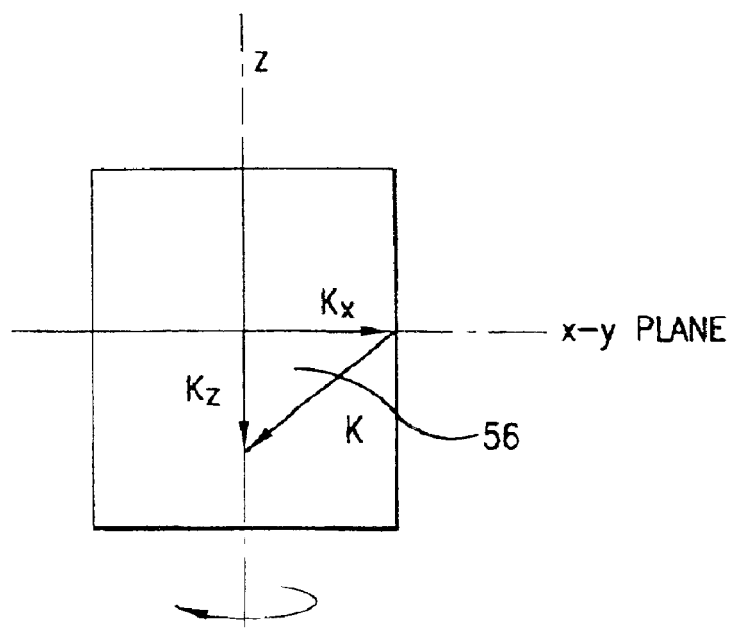
FIG. 2 is an enlarged graphical illustration showing a grating vector in the crystal of FIG. 1.

The crystal 10 is formed about a z-axis 12 and has a cylindrical peripheral surface 14 which extends in the direction of the z-axis and an axially facing, polished x-y surfaces 15 and 16 which extends transverse, or more particularly, perpendicular to the z-axis. As is seen in FIG. 2, when a hologram is created within the cylindrical crystal 10, a grating vector K is disposed obliquely with respect to the x, y plane of the crystal, the grating vector K being comprised of a radial vector Kr and an axial vector Kz.

Figure 3:
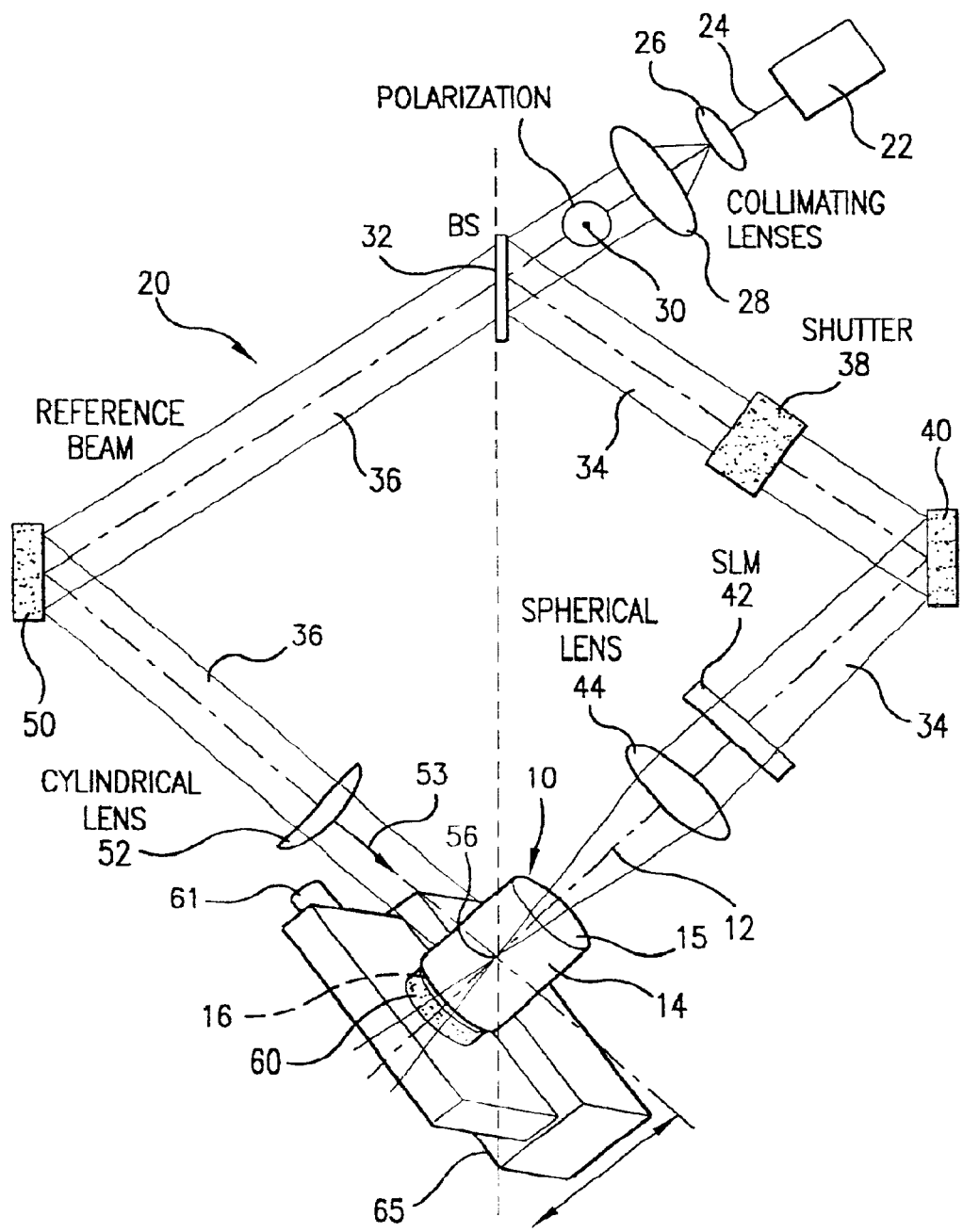
FIG. 3 is a diagramatical illustration of an apparatus for writing a hologram into the crystal of FIG. 1 to thus practice a method of the present invention.

Referring now to FIG. 3 there is shown an apparatus 20 configured in accordance with the principals of the present invention for writing holograms into the crystal 10 in accordance with the methods of the present invention. The apparatus 20 comprises a source 22 for a laser beam 24, which laser beam is passed through a pair of colluminating lenses 26 and 28 and then through a polarizer 30. The colluminized and polarized laser beam 24 is then split by a beam splitter 32 into a signal beam 34 and a reference beam 36. The signal beam 34 passes through an open shutter 38 and is reflected by a reflector 40 into a spacial light modulator (SLM) which encodes data or information onto the signal beam 34 preferably in the form of light and dark pixels or pixel arrays. A spherical lens 44 aligned with the c-axis of the crystal 10 (the c-axis being perpendicular to the axially facing surfaces 15 and 16 and aligned with the z-axis of the crystal) focuses the signal beam into the polished, axially facing flat surface 15 of the cylindrical crystal 10. By sending the signal beam 34 through the axially facing flat surfaces 15 and 16, there is no requirement for special cylindrical lenses to prepare an ordinary polarized signal beam.

The reference beam 36 is directed by an optical path, comprising a reflector 50 and a cylindrical lense 52, radially through the cylindrical peripheral surface 14 of the crystal 10 in the direction of arrow 53. The distance between the cylindrical lens and the crystal 10 is chosen so that the reference beam is collimated in the crystal. Thus the signal beam 34 and reference beam 36 are transverse with respect to one another as they pass into the cylindrical crystal 10. Once the beams 34 and 36 intersect within the cylindrical crystal 10, they interfere to form a hologram 56 inside of the crystal containing the information provided by the SLM i.e. information encoded in light and dark pixel arrays. The grating vector of the hologram 56 lies in a plane parallel to the z-axis 12 shown in FIGS. 1 and 2.

In noncentrosymmetric crystals, such as for example 4 mm symmetry crystals, the electro-optic tensor has circular symmetry about the z-axis 12 of the crystals. Therefore, all of the holograms 56 that can be multiplexed by rotating the cylindrical crystal 10 about the z-axis 12 have the same electro-optic coupling given by the following equation:

$$\Delta n = -\frac{1}{2\sqrt{2}} n_o^3 r_{13} E_{sc}$$

where $R_{13}$ is the electro-optic tensor element $n_0$ is the ordinary refractive index and $E_{sc}$ is the light induced, space charge field parallel to the grating vector K (see FIG. 2).

In 3 m symmetry crystals the electro-optic tensor is not circularly symmetric about the z-axis for holograms written as illustrated in FIG. 2. In this case, the electro-optic coupling is given by the following equation:

$$\Delta n = -\frac{r_{22}}{2\sqrt{2}} n_o^3 \sin\varphi [4\cos^2\varphi - 1] E_{sc}$$

where $R_{22}$ is the electro-optic tensor element and $\phi$ is the angle between the x-axis and the plane of the grating.

Given this theoretical background, it is seen that a plurality of holograms 56 can be stored at different angular spacings in the cylindrical crystal 10 by rotating the cylindrical crystal 10 about its axis 12. In the apparatus of FIG. 3, this is accomplished by utilizing a precision rotator 60 driven by a stepper motor 61 which indexes the cylindrical crystal 10 through relatively small angles θ.

Figure 4:
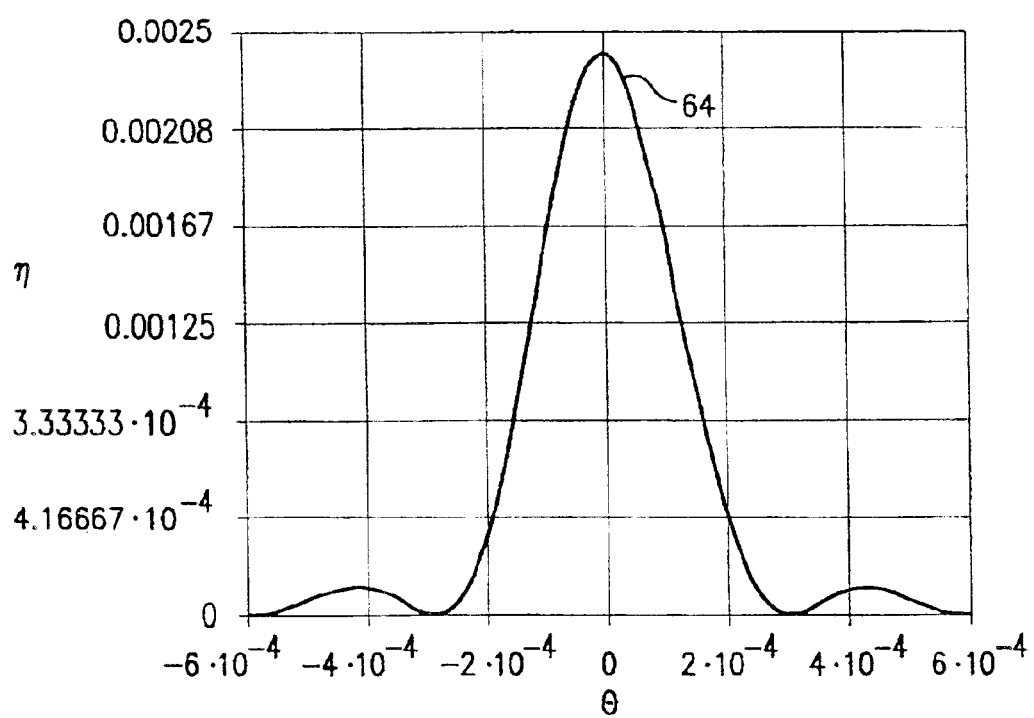
FIG. 4 is a graph plotting holographic efficiency as a function of angle so as to determine angular spacing of holograms written within the crystal of FIG. 1.

As is seen in FIG. 4 where efficiency η is plotted as a function of Δθ, it is clear that a hologram is possible wherever the curve 64 peaks. These peaks occur at a very small angle which in the illustrated embodiment $12.2^{-4}$ rad. This results in a storage density for a plurality of holograms 56 which is extremely high. It is not necessary to store holograms at these close angular spacings if the precision rotator stepper motor 60 cannot index in such small steps, or if it is inconvenient or otherwise difficult to position holograms this close together. The angular indexing steps θ can be substantially larger and still produce an enormous number of holograms in a 360° rotation of the cylindrical crystal 10.

The curve 64 of FIG. 4 which plots holographic density as a function of Δθ is derived from the following equation (3) for determining the efficiency η each hologram:

$$\eta = \left(\frac{1}{1+\left(\frac{K\Delta\theta}{2\kappa}\right)}\right)\left\{\sin^2\left(\left\{\kappa L\left[1+\left(\frac{K\Delta\theta}{2\kappa}\right)\right]\right\}\right)\right\} \text{ and}$$

$$\kappa^2 = \left(\frac{2\pi\Delta n}{\lambda}\right)$$

where Δθ is the angle from the Bragg angle, K is the grating wave vector, L is the interaction length of the signal and reference beams, λ is the laser wavelength and Δn is the change in the refractive index given by Eq. (1) for 4 mm symmetry crystals and Eq. (2) for 3 m symmetry crystals. For efficiencies of $\eta=2.5\times10^{-3}$ the second null occurs 80–6× $10^{-4}$ rad away from perfect Bragg matching as shown in FIG. 4.

If the adjacent holograms are spaced every second null, the storage density for one layer is $$N = \frac{2\pi}{\delta\theta} = 10,470$$

where N is the number of holograms.

Clearly, the number of holograms N is substantial when one considers that each hologram 56 can be a page storing 1 Mb per page as determined by light and dark pixels of pixel arrays provided by the SLM. The theoretical limit at one axial location within the cylindrical crystal 10 is 10,470×1 Mb which equals 10,470 Mbs or 10,470 Gb per 360° rotation of the cylindrical crystal, provided that the precision rotor 60 can accurately achieve a null every $12\times10^{-4}$ rad away from perfect Bragg matching of FIG. 4.

Figure 7:
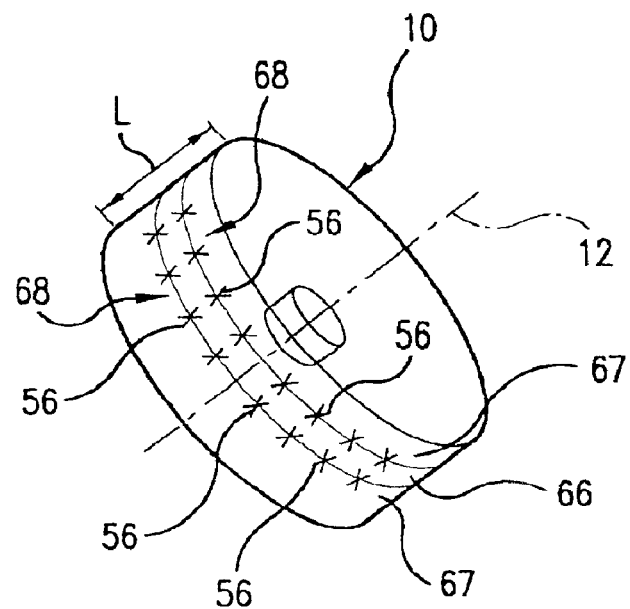
FIG. 7 is an enlarged perspective view of a cylindrical crystal configured as a disk.

The capacity of the cylindrical crystal 10 can then be multiplied by indexing the cylindrical crystal 10 in the axial direction with a linear stepping actuator 65 on which the precision rotor 60 is mounted. For example, if the cylindrical crystal 10 has sufficient thickness or axially length to be indexed axially a distance of 2 mm and it is then rotated 360° while being written into, an additional 10.470 Gb of data can be stored. Since this can be done five times with a cylindrical crystal 10 having an effective axial length of 1 cm i.e. 10 mm, then the cylindrical crystal can store 52.350 Gb of data. Such a cylindrical crystal 10 is shown in the enlarged view of FIG. 7 wherein the cylindrical crystal is shown as a disk 66 having a thickness "L" in the direction of axis 12. The disk 66 has stacked layers 67 of individual holograms 56 recorded in annular arrays 68 therein.

Figure 8:
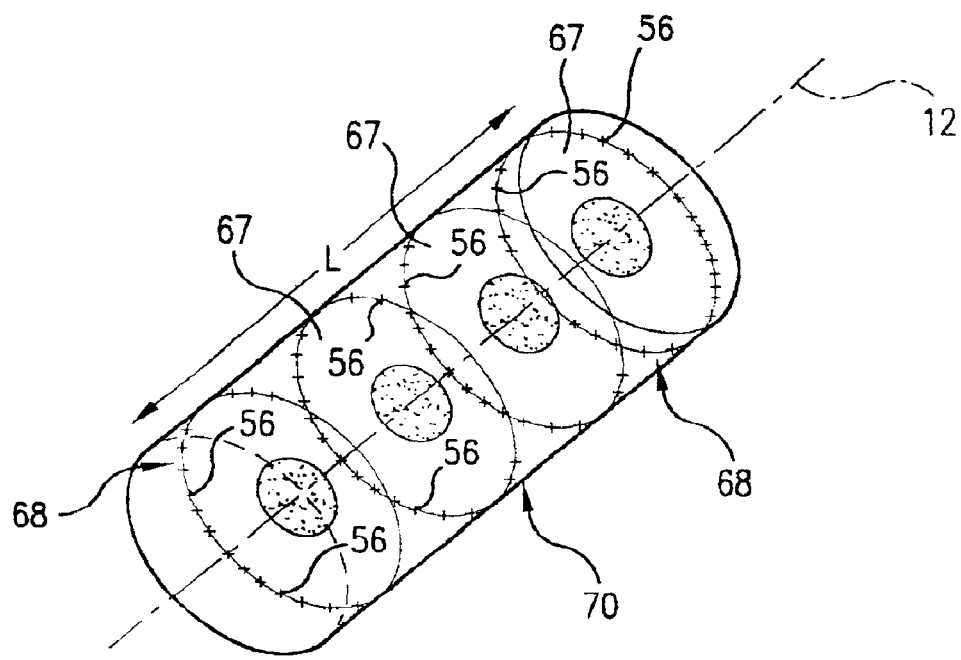
FIG. 8 is an enlarged perspective view of a cylindrical crystal configured as a rod.

If the cylindrical crystal 10 is configured as a rod 70 as shown in FIG. 8 with an axial length "L" of 10 cm then the capacity is 523.50 Gb which is a substantial amount of data. This storage capacity does not necessarily all have to be used to have enormously useful storage capacity for the cylindrical crystal 10. As with the disk 66 of FIG. 6, the rod 70 of FIG. 8 stores stacked layers 67 of individual holograms 56 recorded in annular arrays 68 therein.

Figure 5:
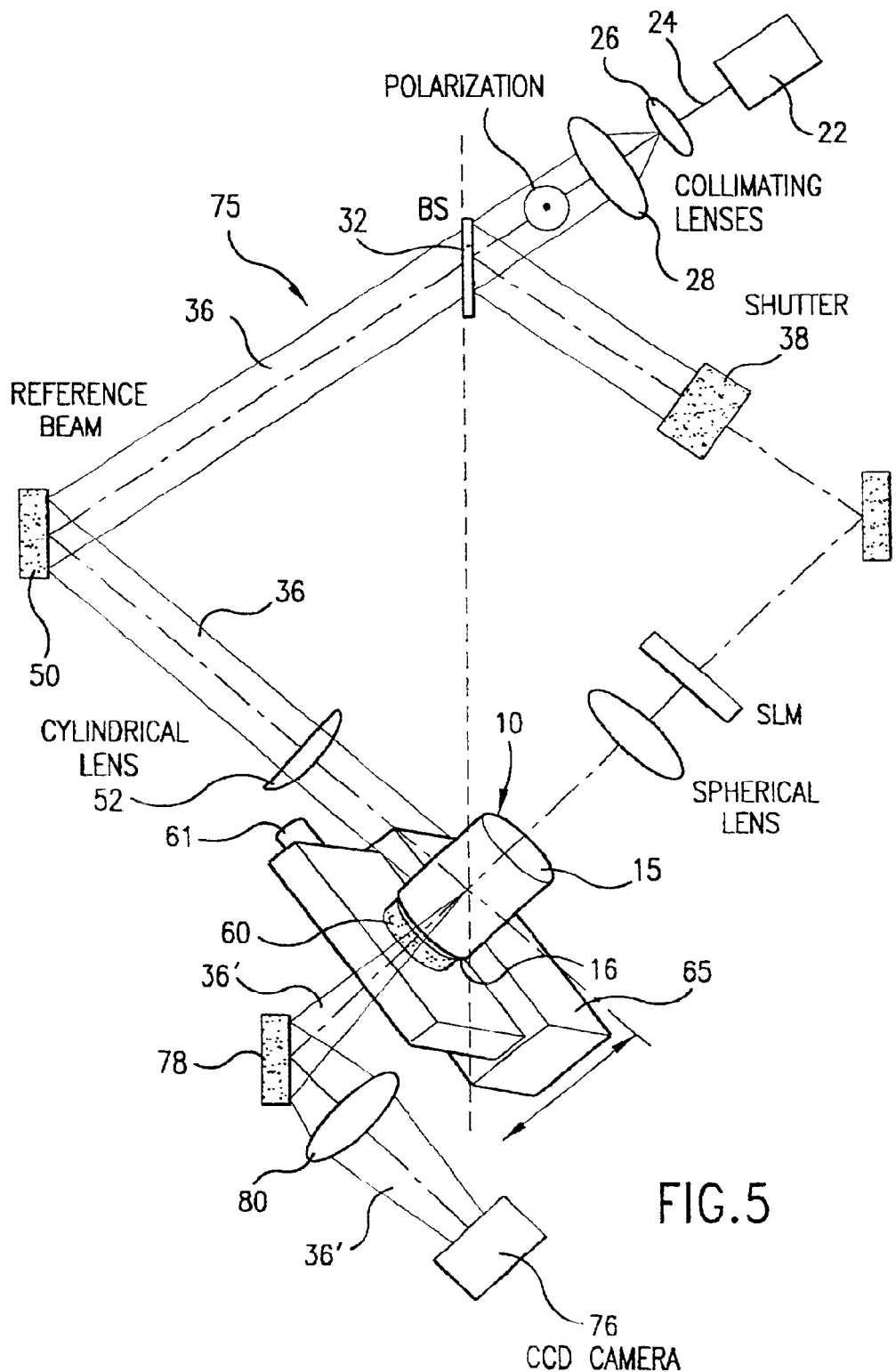
FIG. 5 is a diagramatical view of apparatus for reading holograms out of the crystal of FIG. 1 using a reference beam.

After data has been stored in the cylindrical crystal 10, it is of course desirable to read the data out from the crystal in order to utilize the data. This is accomplished by the readout apparatus of FIGS. 5 and 6. Referring first to FIG. 5, there is shown a readout apparatus 75 which is substantially identical to the writing apparatus 20 of FIG. 3, but includes a detector 76, in the form of a charge coupled device (CCD) such as a CCD camera. When the readout apparatus 75 of FIG. 4, the shutter 38 is closed so that only a reference beam 36 is generated. Reference beam 36 is again focused through the cylindrical lens 52 into the cylindrical crystal 10 and is diffracted by the holograms 56 within the cylindrical crystal to produce diffracted beam 36'. The diffracted reference beam 36' emerges axially from the cylindrical crystal 10 and is reflected by a reflector 78 in a direction transverse, i.e. normal to the axis 12 of the cylindrical crystal 10. The diffracted reference beam 36', reflected by the reflector 78 is then focused through a spherical lens 80 into the detector 76, which is preferably a CCD camera. In the readout apparatus 75 of FIG. 4, it is necessary to rotationally index the cylindrical crystal 10 about the axis 12 during readout and this is again accomplished by the precision rotator 60. It is also necessary to index the cylindrical crystal 10 axially in the direction of its z-axis 12 in order to read holograms of different layers 66. This is accomplished by the linear stepping actuator 65 which shifts the crystal 10, and perhaps the stepping motor 61 in an assembly therewith, in axial increments to read stacked layers 66 axially distributed in the cylindrical crystal.

Figure 6:
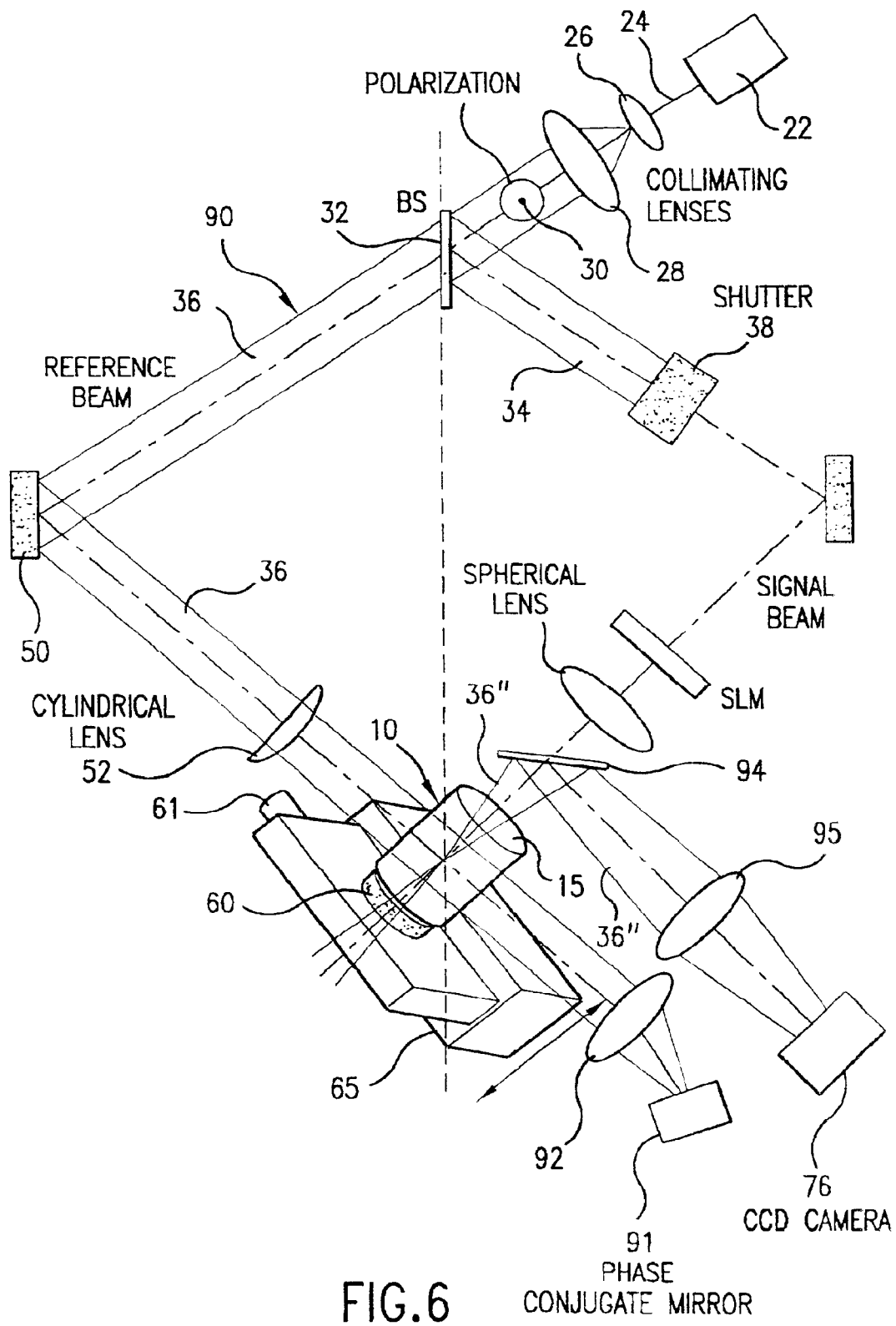
FIG. 6 is a diagramatical view showing an apparatus for reading holograms out of the crystal of FIG. 1 by using a phase conjudate beam developed from the reference beam.

Referring now to FIG. 6, where a readout apparatus 90 is shown, modification to the apparatus as shown in FIG. 3 is minimal because the precision rotator 60 which provides rotational stepping and the linear stepping actuator 65 need not be moved. In the readout apparatus 90, a phase conjugate mirror 91 is positioned radially with respect to the axis 12 of the cylindrical crystal 10 so that the reflected reference beam 36' that passes through the cylindrical crystal can be focused by a lens 92 onto the phase conjugate mirror to create a phase conjugate diffracted beam 36". The phase conjugate beam 36" diffracts from the hologram and the diffracted beam emerges axially from the cylindrical crystal 10 and is reflected by a beam splitter 94 through a cylindrical lens 95 which focuses the diffracted beam 36" into the detector 76, which is again preferably in the form of a CCD camera.

The readout apparatuses 75 and 90 represent one of what might be numerous readouts at various locations, such as for example customer's facilities. Since readouts do not need a reference beam 34, beam splitter 32, shutter 38, mirror 40, SLM 42 or spherical lens 44, these devices may be deleted for readouts.

In the illustrated embodiment of the invention, the cylindrical crystal 10 is angularly and axially indexed because this is a preferable approach to practicing the method and apparatus of the invention. However, it is for the purposes of this invention only necessary that the signal in reference beams and the cylindrical crystal 10 have relative motion. Accordingly, the cylindrical crystal 10 may be held stationary while the apparatus is moved relative thereto. This may be accomplished by mechanically moving the apparatus around and along the cylindrical crystal 10 or by optically steering the signal and reference beams 34 and 36 with respect to the cylindrical crystal 10. In order to write into the cylindrical crystal 10, a combination of relative motions is also possible within the scope of this invention, wherein the apparatus is mechanically moved, the signal and reference beams are optically steered and the cylindrical crystal is moved, either rotationally or axially or both rotationally and axially.

While in the preferred and illustrated embodiment, signal beam 34 is introduced axially into the cylindrical crystal 10 and the reference beam 36 is introduced radially into the cylindrical crystal, in another embodiment, the reference beam 36 might be introduced axially and signal beam 34 introduced radially to write holograms into the cylindrical crystal.

In the illustrated and preferred embodiment, crystal 10 is a cylindrical crystal, however, since a cylinder is a polygon with an infinite number of sides, it is within the scope of this invention to have a crystal 10 which is a polygon that rotates about the axis 12 or any other shape that rotates about an axis. For example, crystal 10 could be of an oval configuration.

From the foregoing description, one skilled in the art can easily ascertain the essential characteristics of this invention, and without departing form the spirit and scope thereof, can make various changes and modifications of the invention to adapt it to various usages and conditions.

What is claimed is:

1. A method of storing data in the form of holograms in a crystal, comprising;

providing a cylindrical crystal formed about an axis, the crystal having an axially facing surface and a peripheral surface extending transverse to the axially facing surface;

from a source of laser light, providing a signal beam containing the data and focusing the signal beam through the axially facing surface of the cylindrical crystal;

from a source of laser light, providing reference beam and focusing the reference beam through the peripheral surface of the cylindrical crystal to interfere with the signal beam and thereby write a hologram in the cylindrical crystal;

rotating the cylindrical crystal and laser light with respect to one another about the axis of the cylindrical crystal to write additional holograms in the cylindrical crystal in an annular array;

indexing the crystal axially with respect to the beams to write numerous annular arrays stacked axially within the crystal;

reading the hologram out of the crystal by passing a reference beam therethrough to diffract from the holograms and produce a diffracted beam including the data of the holograms;

converting the transmitted reference beam to a phase conjugate beam that diffracts from the hologram, and reading the phase conjugate beam with a detector.

2. An apparatus for reading holograms into a cylindrical crystal formed about an axis, comprising:

a source of laser light passing through a polarizing device;

an optical path for directing a reference beam into the crystal in a radial direction with respect to the axis of the crystal for interference with the holograms within the crystal to direct images of the holograms axially out of the crystal;

a phase conjugate mirror positioned radially of the crystal to produce a phase conjugate beam containing the images that propagates back along the axis of the crystal, and a detector positioned to receive the axially directed images.

3. The apparatus of claim 2 further including a support for the crystal, the support including a motor for rotating the crystal about the axis to read angularly spaced holograms therein.

4. The apparatus of claim 3 further including an axial translator associated with the support for moving the crystal axially to read holograms in layers axially spaced with respect to one another.

5. The apparatus of claim 4 wherein the detector is a charge coupled device.

6. The apparatus of claim 5 wherein the images of the holograms are coupled to the detector by a mirror reflecting the images transversely to the axis through a lens for focusing into the charge coupled device.

7. A method of storing data in the form of holograms in a crystal, comprising;

provliding a cylindrical crystal formed about an axis, the crystal having an axially facing surface and a peripheral surface extending transverse to the axially facing surface;

from a source of laser light, providing a signal beam containing the data and focusing the signal beam through the axially facing surface of the cylindrical crystal;

from a source of laser light, providing reference beam and focusing the reference beam through the peripheral surface of the cylindrical crystal to interfere with the signal beam and thereby write a hologram in the cylindrical crystal;

rotating the cylindrical crystal about the axis thereof to write additional holograms in the cylindrical crystal in an annular array;

reading the holograms by passing a reference beam through the crystal and diffracting the reference beam from the holograms to produce a diffracted reference beam including the data of the holograms;

converting the diffracted reference beam to a phase conjugate beam, and reading the phase conjugate beam with a detector.

* * * * *